United States Patent
Grafe et al.

(10) Patent No.: US 7,258,049 B2
(45) Date of Patent: Aug. 21, 2007

(54) METHOD OF OPERATING A FLYING SHEAR

(75) Inventors: Horst Grafe, Hilchenbach (DE); Jürgen Merz, Kreuztal (DE); Jochen Münker, Kreuztal (DE); Duane A. Nielsen, Knoxville, TN (US); Michael L. Barry, Knoxville, TN (US)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 11/007,609

(22) Filed: Dec. 8, 2004

(65) Prior Publication Data

US 2005/0183557 A1 Aug. 25, 2005

Related U.S. Application Data

(62) Division of application No. 09/958,621, filed as application No. PCT/EP00/03168 on Apr. 10, 2000, now abandoned.

(30) Foreign Application Priority Data

Apr. 16, 1999 (DE) ............... 199 17 389
Jan. 13, 2000 (DE) ............... 100 01 072

(51) Int. Cl.
*B26F 3/02* (2006.01)
*B31B 1/25* (2006.01)

(52) U.S. Cl. .............. 83/37; 225/2; 225/93; 83/880; 83/37

(58) Field of Classification Search .......... 83/304, 83/305, 344, 51, 37, 30, 880, 861, 875, 879; 225/100, 104, 2, 93

See application file for complete search history.

(56) References Cited

U.S. PATENT DOCUMENTS

| | | | | |
|---|---|---|---|---|
| 2,096,305 A | * | 10/1937 | Miller | 83/564 |
| 2,244,673 A | * | 6/1941 | Bruker | 83/344 |
| 2,800,179 A | * | 7/1957 | Munchbach | 83/321 |
| 3,058,379 A | * | 10/1962 | Gustavsson | 83/314 |
| 3,277,759 A | * | 10/1966 | Brombach et al. | 83/316 |
| 3,398,616 A | * | 8/1968 | Elineau | 83/305 |
| 3,570,337 A | * | 3/1971 | Morgan | 83/886 |
| 3,643,537 A | * | 2/1972 | Fries | 83/305 |
| 3,748,938 A | * | 7/1973 | Munchbach | 83/305 |
| 3,750,510 A | * | 8/1973 | Gabriels | 83/305 |
| 4,159,661 A | * | 7/1979 | Russell et al. | 83/305 |
| 4,454,973 A | * | 6/1984 | Irvine | 225/100 |
| 4,524,894 A | * | 6/1985 | Leblond | 225/2 |
| 4,529,114 A | * | 7/1985 | Casper et al. | 225/100 |
| 4,618,085 A | * | 10/1986 | Kimura et al. | 225/100 |
| 4,856,396 A | * | 8/1989 | Brinkmeier et al. | 83/304 |

(Continued)

FOREIGN PATENT DOCUMENTS

DE 19809813 A1 * 9/1999

*Primary Examiner*—Boyer D. Ashley
*Assistant Examiner*—Jason Prone
(74) *Attorney, Agent, or Firm*—Friedrich Kueffner

(57) ABSTRACT

A method of operating a flying shear for cutting a rolled strip, which includes at least one drum provided with a blade, includes synchronizing a peripheral speed of the blade with a feed rate of the rolled strip, and cutting the rolled strip by effecting a partial penetration of the blade in the rolled strip to produce a weakened location of the rolled strip, and by tearing the rolled strip at the weakened location by a tensile force.

5 Claims, 4 Drawing Sheets

U.S. PATENT DOCUMENTS

| | | | |
|---|---|---|---|
| 5,220,858 A * | 6/1993 | Allen et al. | 83/880 |
| 5,744,776 A * | 4/1998 | Bauer | 219/121.71 |
| 6,152,003 A * | 11/2000 | Jung | 83/940 |
| 6,257,475 B1 * | 7/2001 | Ishii et al. | 225/100 |
| 7,107,891 B2 * | 9/2006 | Kneppe et al. | 83/37 |
| 2002/0035906 A1 * | 3/2002 | Rosenthal et al. | 83/305 |

* cited by examiner

METHOD OF OPERATING A FLYING SHEAR

REFERENCE TO RELATED APPLICATIONS

This application is a divisional application of U.S. patent application Ser. No. 09/958,621 filed Jan. 3, 2002 now abandoned, which is the national phase of International application PCT/EP00/03168, filed Apr. 10, 2000.

BACKGROUND OF THE INVENTION

1. Field of the Invention

The present invention relates to a method of operating a flying shear which has at least one drum provided with a blade. The method comprises synchronizing the peripheral speed of the blade with the feed rate of rolled strip.

2. Description of the Related Art

Such synchronized shears are known, for example, from DE 196 37 862 A1 as high-speed shears for cutting rolling strip to length. In this connection, two oppositely positioned drums which can be advanced toward one another are used which are both provided with blades, or only one of the drums is provided with an anvil or is used as an anvil.

The advancing strokes are dimensioned such that the two blades of two oppositely positioned drums overlap at a minimal distance or the shearing edge of one blade rests under pressure against the anvil of the oppositely positioned drum or its periphery. However, it was found that for such shearing processes the wear of the blades and of the anvil surfaces, if employed, is undesirably high, and it was found that the manufacture of the shears must be realized within the most narrow tolerances—a factor increasing manufacturing costs—for achieving an exact placing of the blades onto a anvil or for a defined cut with two blades in order to ensure perfect cutting efficiency.

GB 2 203 677 A discloses already a shearing device comprising a blade and an anvil which are adjusted relative to one another such that the strip to be cut is only scored. By a later application of tensile force onto the strip, tearing occurs at the scored areas resulting in a separation of the strip. In these shearing devices, an anvil drum, which must be synchronized in a complex way, is required in addition to the blade drum. Moreover, contacting of the strip with the anvil drum can cause damage to the strip.

SUMMARY OF THE INVENTION

It is the object of the present invention to provide a method of operating a flying shear in such a way that wear and manufacturing costs are minimized and broader manufacturing tolerances are achieved without impairing the cutting efficiency.

In accordance with the present invention, the rolled strip is cut by causing a partial penetration of the blade into the rolled strip and tearing of the rolled strip as a result of tensioning forces occurring in the strip.

Accordingly, in the method according to the present invention, only a partial penetration of the blade or a wedge into the rolling strip is effected in order to significantly reduce the cross-section of the strip at the cutting location in a defined manner and to perform the separation then by tensile forces exerted onto the rolling strip, wherein the use of an anvil drum with a correspondingly complex synchronization is eliminated.

The various features of novelty, which characterize the invention, are pointed out with particularity in the claims annexed to and forming part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
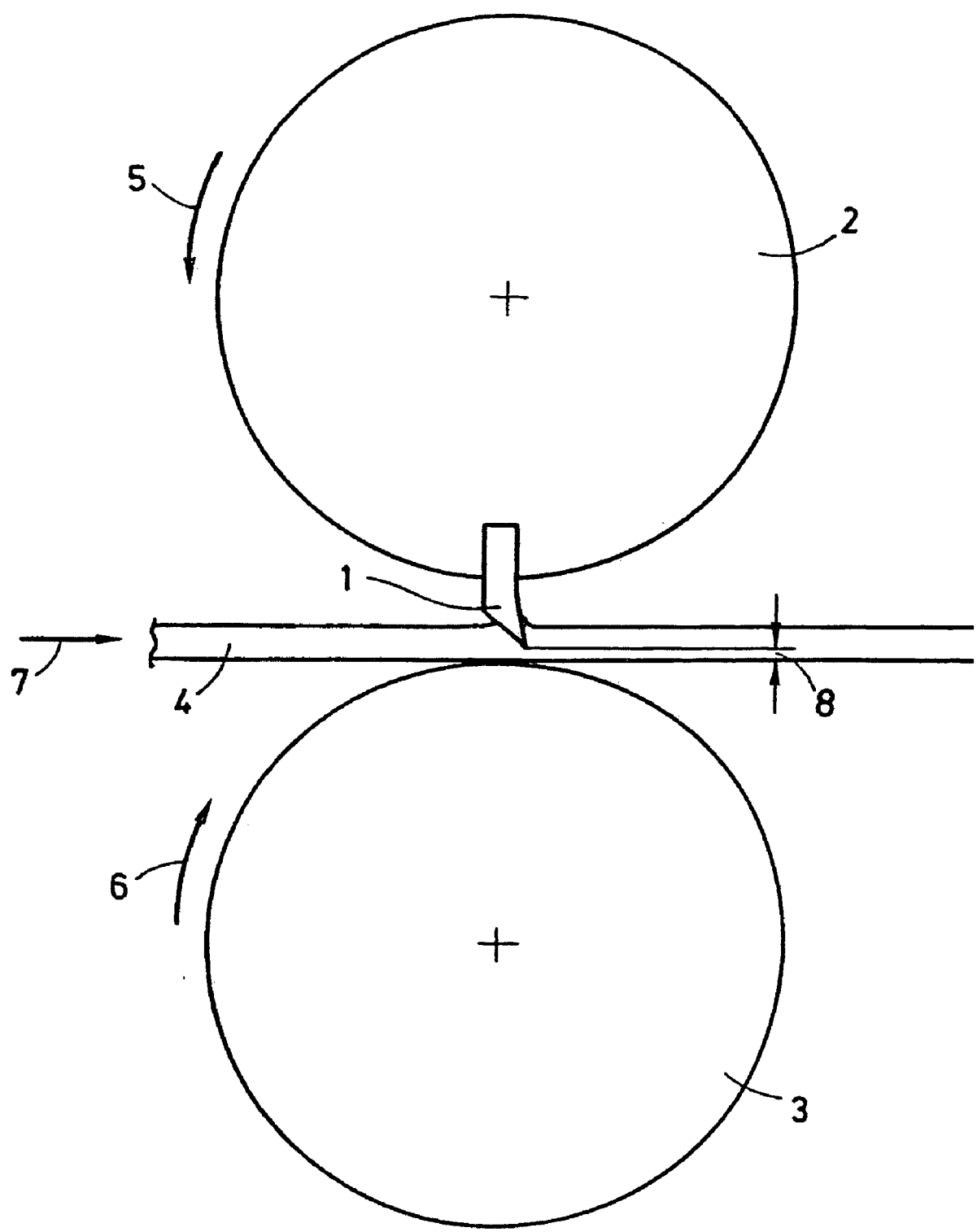
FIG. 1 is a schematic view of a first embodiment of a shear having a blade drum and an anvil drum.

In FIG. 1, a blade drum 2 supporting a blade 1 is illustrated, and a smooth anvil drum 3 is positioned opposite thereto and acts as the anvil. The rolling strip 4 runs in the direction of arrow 7 between the blade drum rotating in the direction of arrow 5 and the anvil drum 3 rotating in the opposite direction 6.

Usually, in the case of high-speed shears the blade drum 2 is positioned above the rolling strip 4 to such an extent that its blades 1 do not contact the rolling strip 4. For performing the cut, however, the blade drum 2, driven for several rotations at a peripheral speed matching the feed rate of the rolling strip, is advanced spontaneously by means of an advancing device in the direction toward the anvil drum 3 so that the blade 1 penetrates the rolling strip 4 and cuts it leaving a residual thickness illustrated by the double arrow 8.

For a strip which is moved slower, there is the possibility of eliminating the advancing device and, for each movement into the active position, of accelerating the blade drum 2, arranged at a fixed spacing to the anvil drum 3, for approximately one rotation of the blade drum 2 to a peripheral speed matching the speed of the rolling strip.

A tensile force is now exerted onto the rolling strip 4 advancing in the direction of arrow 7 so that the rolling strip will tear at the separation location which is greatly weakened by the blade 1.

Accordingly, the separation is not performed purely as a cut, but instead only by a penetration of the blade 1 or of a wedge into the material of the rolling strip 4 to a degree that the strip is significantly weakened at this separating location. The tensile force required for the final separation can be applied differently. On the one hand, it is possible to apply this tensile force onto the rolling strip 4 itself; but there is also the possibility of maintaining the peripheral speed of the blade drum 2 somewhat smaller or somewhat greater than the feed rate 7 of the rolling strip 4 so that the tensile force, which causes the tearing of the rolling strip 4, is effected between the blade 1 and the leading or trailing end of the rolling strip 4. However, there is also the possibility of configuring the speed differences or tensile force differences such that the separation is effected by them.

Figure 2:
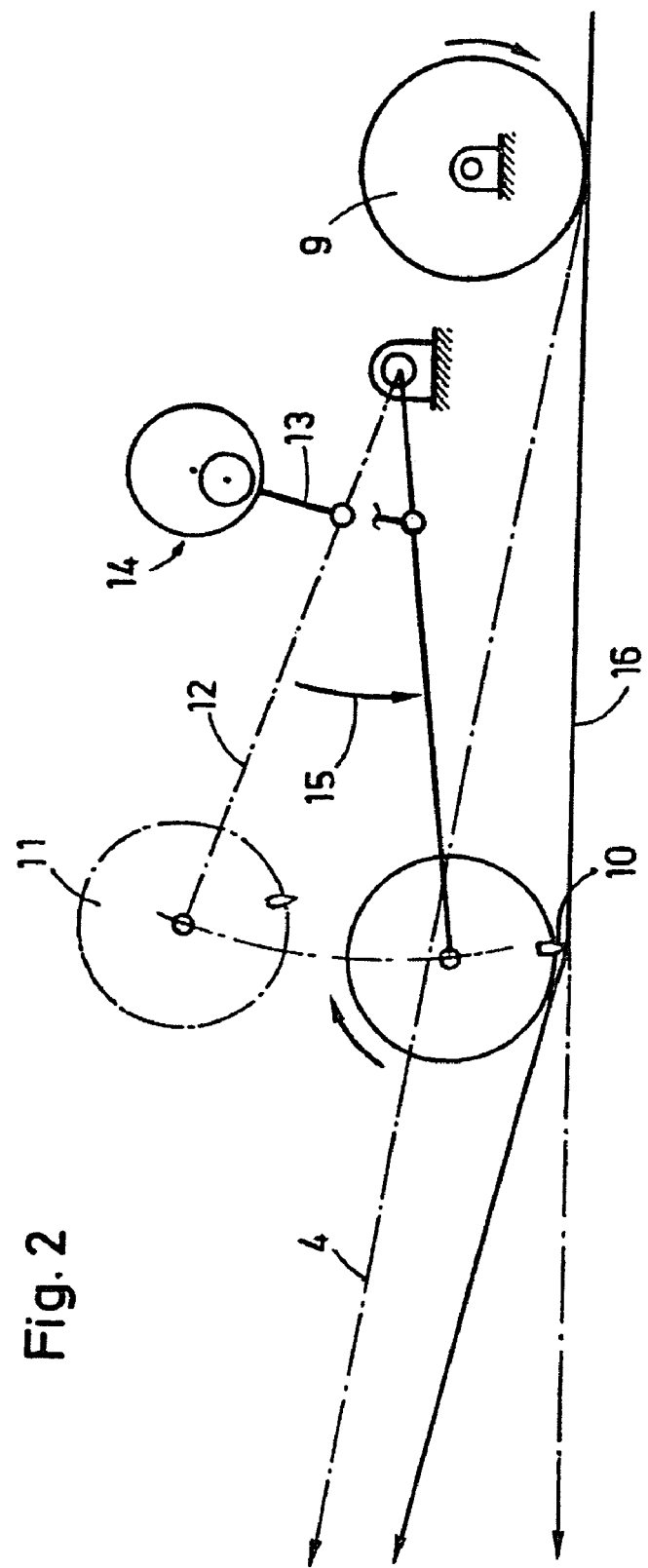
FIG. 2 is a schematic illustration of a second embodiment of a shear without anvil drum.

In accordance with the invention, the anvil drum is not used. Thus, in FIG. 2, a blade drum 11 supporting a blade or wedge 10 is illustrated. The blade drum 11 is arranged at the end of a lever arm 12 having correlated therewith an eccentric 14 which is force-actuated and serves as an advancing device by means of a guide 13.

Figure 3:
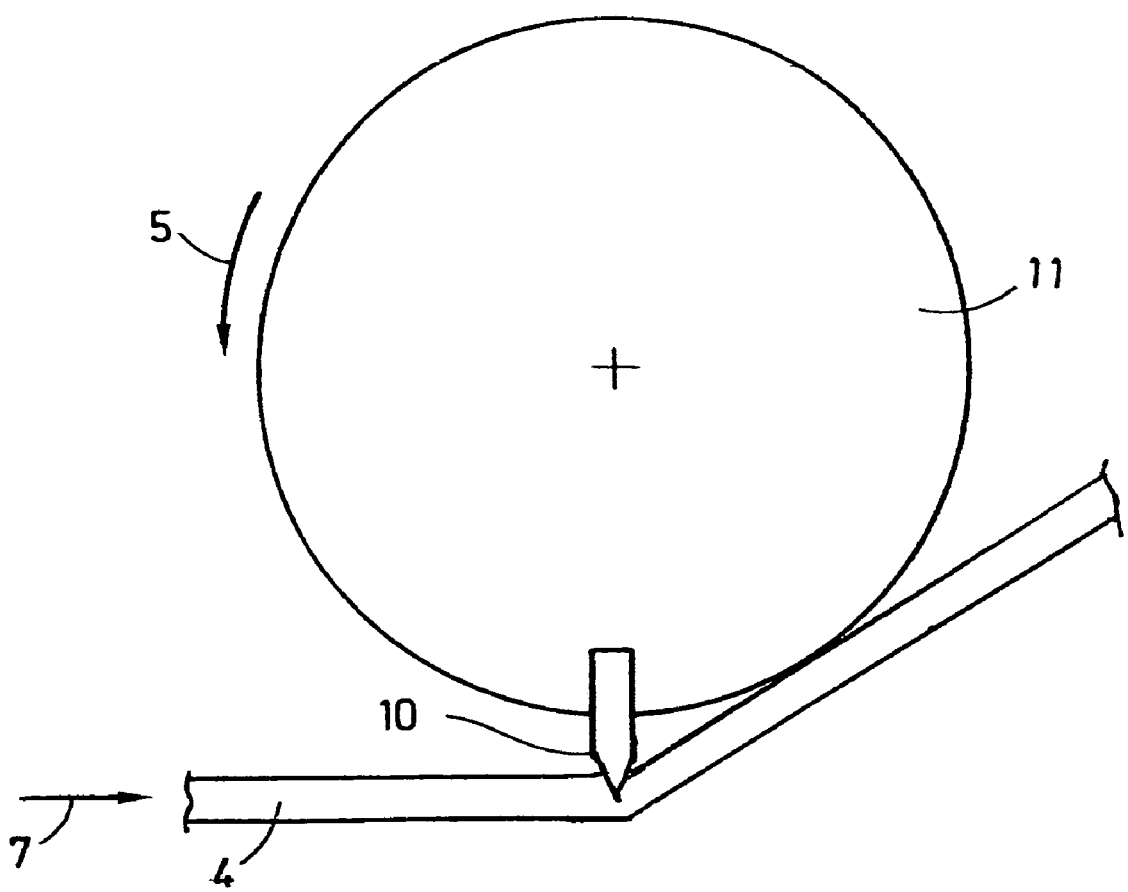
FIG. 3 is a schematic view of the second embodiment with a blade drum partially penetrating a rolling strip, without an anvil drum.
Figure 4:
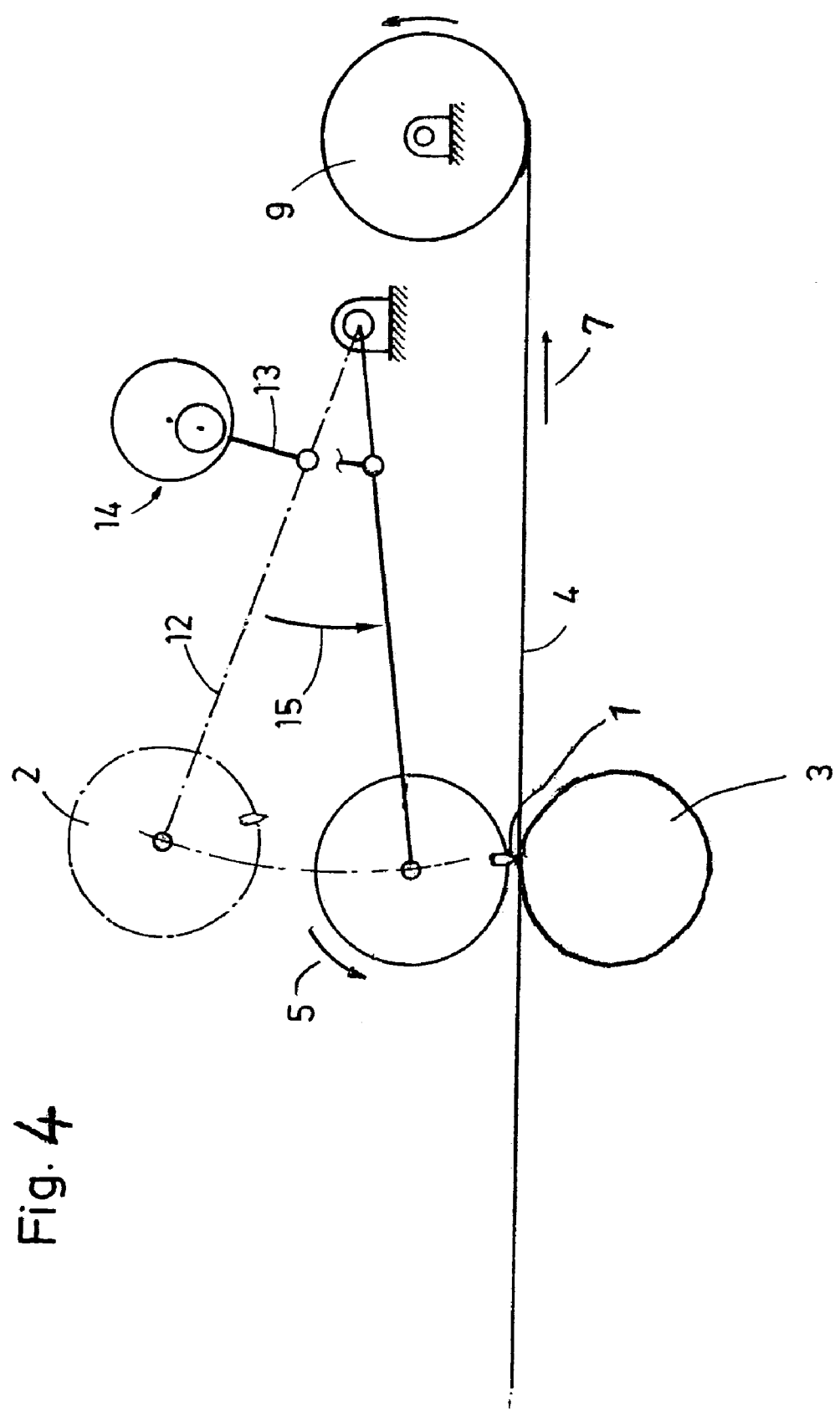
FIG. 4 is a schematic illustration of the first embodiment having a shear with an anvil drum.

Usually, in the case of high-speed shears the blade drum 11 is positioned above the rolling strip 4 to such an extent that its blades 10 do not contact the rolling strip 4. For performing the cut, however, the blade drum 11, driven for several rotations at a peripheral speed matching the feed rate of the rolling strip, is advanced spontaneously by means of the advancing device in the direction toward the rolling strip so that the blade 10 penetrates the rolling strip 4 and cuts it leaving a residual thickness (See FIG. 3 and FIG. 4).

For a strip which is moved slower, there is the possibility of eliminating the advancing device and, for each movement into the active position, of accelerating the blade drum 11, arranged at a fixed spacing to the rolling strip 4, for approximately one rotation of the blade drum 11 to a peripheral speed matching the speed of the rolling strip.

A tensile force is now exerted onto the rolling strip 4 advancing in the direction of the arrow so that the rolling strip will tear at the separation location which is greatly weakened by the blade 10.

Accordingly, the separation is not performed purely as a cut, but instead only by a penetration of the blade 10 or of a wedge into the material of the rolling strip 4 to a degree that the strip is significantly weakened at this separating location. The tensile force required for the final separation can be applied differently. On the one hand, it is possible to apply this tensile force onto the rolling strip 4 itself; but there is also the possibility of maintaining the peripheral speed of the blade drum 11 somewhat smaller or somewhat greater than the feed rate of the rolling strip 4 so that the tensile force, which causes the tearing of the rolling strip 4, is effected between the blade 10 and the leading or trailing end of the rolling strip 4. However, there is also the possibility of configuring the speed differences or tensile force differences such that the separation is effected by them.

In the embodiment, the rolling strip 4 is removed from a coiler 9. The blade drum 11 provided with a wedge 10 rotates at the end of the lever arm 12. The eccentric 14 is actuated for carrying out the cut and pivots by means of the guide 13 the lever arm 12 as well as the blade drum 11 into their active position 15.

In its active position 15 the blade drum 11 bends the rolling strip 4 downwardly to the line 16 and the wedge 10 penetrates accordingly into the rolling strip 4, this being effected by the impact of the blade drum onto the mass of the rolling strip 4 as well as the forces resulting from movement of the rolling strip. The longitudinal forces, resulting from removal of the rolling strip 4 and/or from the rotation of the blade drum with partially penetrated wedge 10, separate the rolling strip 4.

The invention enables several variants. For example, as an advancing device hydraulic pistons engaging lever arms can be provided as well as hydraulic pistons which engage a linear guide. Eccentric devices are also possible which determine by means of a tab the pivot angle of a lever arm or whose eccentrics engage directly a guide of the lever arm. In any case, the desired wear reduction as well as the elimination of machining of the shear parts within narrow tolerances are made possible so that, in accordance with the object, a simply configured shear is provided which is exposed only to relatively minimal wear.

The invention is not limited by the embodiments described above which are presented as examples only but can be modified in various ways within the scope of the protection defined by the appended patent claims.

We claim:

1. A method of operating a flying shear for transversely cutting a rolling strip wherein the shear includes at least one drum provided with a blade, the method comprising the steps of: synchronizing a peripheral speed of the blade with a feed rate of the rolling strip, cutting the rolling strip by effecting a partial penetration of the blade in the rolling strip to produce a weakened location simultaneously across an entire width of the rolling strip, and tearing the rolling strip at the weakened location by a tensile force, and wherein a mass of the rolling strip that is accelerated by pushing from the blade drum and a tension force created by deflection of the rolling strip act as an anvil for the blade.

2. The method according to claim 1, comprising moving the blade drum by means of an advancing device into an active position in which at least the blade of the blade drum is in cutting contact with the rolling strip.

3. The method according to claim 1, comprising applying the tensile force on the rolling strip.

4. The method according to claim 1, comprising maintaining the peripheral speed of the blade so as to be greater than the feed rate of the rolling strip.

5. The method according to claim 1, comprising maintaining the peripheral speed of the blade so as to be smaller than the feed rate of the rolling strip.

* * * * *